United States Patent [19] [11] 4,124,551
Mathai et al. [45] Nov. 7, 1978

[54] ALIPHATIC HYDROCARBON SOLVENT REDUCIBLE ACRYLIC ENAMEL OF IMPROVED QUALITY

[75] Inventors: John Mathai, Chicago; Thomas W. Druetzler, Riverdale, both of Ill.

[73] Assignee: The Sherwin-Williams Company, Cleveland, Ohio

[21] Appl. No.: 836,336

[22] Filed: Sep. 26, 1977

[51] Int. Cl.$^2$ .......................... C09D 3/74; C09D 3/80
[52] U.S. Cl. .......................... 260/23 AR; 260/23 EP; 260/23 ST; 260/23 S
[58] Field of Search ......... 260/23 EP, 23 AR, 23 ST, 260/23 S

[56] References Cited
FOREIGN PATENT DOCUMENTS

| | | | |
|---|---|---|---|
| 767,476 | 2/1957 | United Kingdom | 260/23 AR |
| 793,776 | 4/1958 | United Kingdom | 260/23 AR |
| 1,227,398 | 4/1971 | United Kingdom | 260/23 AR |
| 1,313,652 | 4/1973 | United Kingdom | 260/23 AR |
| 1,399,159 | 6/1975 | United Kingdom | 260/23 AR |

*Primary Examiner*—Ronald W. Griffin
*Attorney, Agent, or Firm*—Richard G. Smith; James V. Tura

[57] ABSTRACT

This invention relates to novel fast-drying aliphatic solvent soluble acrylic-styrene polymer vehicles of paramount value as the binder vehicle for enamels and particularly for automotive after-market refinishing.

Improvement in the quality and durability of automotive enamels in general has been outstanding with the advent of acrylic polymers useful as the adhesive binder in coatings for cars. When applied in production lines to automobile bodies originally under factory conditions, the use of high solvency enamel solvents and reducers has been a relatively obscure problem until recognition of the contribution of aromatic hydrocarbons solvents to smog development. Priorly curing or drying automotive paint films at a rapid speed has been feasible with elevated temperatures with little or no concern for energy consumption or atmospheric pollution. Large capital expenditures for high production rates with concurrent energy consumption have been heretofore acceptable generally. Part of the high energy requirement is due to the characteristically poor solvent release of acrylic polymers of the prior art.

Essentially the vehicle comprises a first polymer of acrylic monomers chemically modified with a drying oil fatty acid moiety and isobornyl methacrylate in a first step in which a monomer comprising styrene is polymerized in a second step to produce an aliphatic solvent soluble enamel vehicle binder.

5 Claims, No Drawings

ALIPHATIC HYDROCARBON SOLVENT REDUCIBLE ACRYLIC ENAMEL OF IMPROVED QUALITY

The predominant need to refinish original automotive equipment arises mostly through normal aging, but more often by repair due to accident and attendant body work. The strong volatile solvents including aromatic hydrocarbons, esters, ethers and ketones essential to enamal application have become increasingly objectionable air pollutants. Governmental authorities (as in California under Rule 66) have made many erstwhile enamel solvents illegal because of their contribution to smog formation and their ill effects upon the health of body shop workmen when ventilation at the point of application is inadequate. Additionally, while the prior art acrylic enamels dry primarily by solvent evaporation at a rapid rate when force dried under heat, repaint shops with limited capital have difficulty providing sufficient heat and ventilation to cure out enamel films fast enough to keep the work moving through their limited available storage space.

This is particularly true when more than one color is required or when, for one reason or another, masking tape has to be applied over a freshly deposited enamel film. Unless the first color applied has dried (cured) the masking tape will cause surface aberration and optical damage to the fresh film and often removes some of the newly applied enamel when stripped. Thus, the recoat body shop holds and delays jobs until the masking tape can be safely applied and safely removed. Even with single color application, masking around windows, chrome strip, etc. often requires long delays before the body can be completely repainted for the customer and the unit moved out of the shop.

The compositions of this invention are particularly suited to automotive refinish and repair and repaint shops, but the quality is such that there are many other uses for pigmented polymers or enamels of the quality herein disclosed having quick dry without energy expenditure, hard abrasive-resistant finishes and excellent gloss for other than the auto body refinish market.

It is, therefore, a particular objective of this invention to provide a high quality automative enamel vehicle or binder particularly useful in automotive finishing and re-finishing having quick dry to permit early masking, good solubility in aliphatic hydrocarbon solvents, hardness, clarity and weather and chemical resistance.

This objective and others of similar nature have been met with the following compositions and methods as will be apparent in greater detail from the illustrative examples which follow.

Acrylic enamel vehicles, broadly, are not novel in a general sense and are believed to represent the most promising advances in recent automotive enamel art.

Among prior art patents most closely related to the acrylic enamels disclosed herein known to us are the following: British Pat. Nos. 767,476; 793,776; and 1,227,398 all of which use an epoxy group containing acrylic monomer along with other acrylic monomers to produce acrylic enamel vehicles for automotive enamel end use. British Pat. No. 1,399,159 (Tulacs et al) discloses use of drying and semi-drying oils as well as rosin acids. However, polyfunctional acids are essential to the foregoing which acids are detrimental when made a part of the disclosed acrylic vehicles of this invention.

British Pat. No. 1,313,652, while having some elements of similarity to the herein disclosed compositions, requires use of strong solvents, yield slower drying finishes and are less advantageous generally because of other essential modifiers required in their compositions.

The objects of this invention provide basically an oil-modified acrylic type enamel vehicle which in the preferred practice and composition is infinitely dilutable with volatile aliphatic hydrocarbon solvents (of low kauri butanol number) wherein an initial polymer is made by solvent reaction at or below the reflux temperature of the solvent and reactant monomer mixture.

The preferred method of manufacture of the novel vehicles of this invention is to load a distilling vessel with an organic inert solvent and the monomeric acrylic components including from 5 to less than 50% of glycidyl methacrylate, 10 to 45% of a drying oil fatty acid or ester of a drying oil fatty acid having an unreacted carboxyl group and from 35 to 75% by weight of an alkyl acrylate including at least about 10% of isobornyl methacrylate or acrylate blend. The initial acrylic polymer is formed by free radical polymerization utilizing such free radical initiators as are known in the art including t-butyl perbenzoate, t-butyl peroctoate, dibenzoyl peroxide, azo-bis-isobutyronitrile, etc. The drying oil fatty acid moiety has an unreacted acid group which reacts with the oxirane group of the glycidyl acrylate, aided by catalytic amounts of a tertiary amine to form the oil-modified acrylic portion of the initial polymeric oil modified acrylic resin solution.

The initial polymer forming reactants are heated slowly to about 180° F. with good agitation and polymerization is carried forward to about 240° F., until a clear pill is obtained and an acid value of about 30 is reached. The secondary polymerization is carried out at about 250° F. The second monomer addition consists essentially of styrene which may account for from 1% to 100% and advantageously from 25 to 50% of the weight of the initial polymer mass. During the slow styrene addition and polymerization, periodic additions of t-butyl perbenzoate catalyst are made.

It is practially feasible to blend the styrene monomer with minor amounts of other reactive monomers including selected alkyl acrylates and methacrylates and isobornyl methacrylate although it is not essential that this be done to be within the purview of this improvement in the automotive vehicle art.

The initial or first polymer produced in a two step process sequence contains in addition from 35 to about 75% by weight of the solids content (non-volatile portion) thereof of one or more of the group consisting of the alkyl acrylates and alkyl methacrylates and additionally and specifically from about 5% to 50% of an isobornyl acrylate (acrylate here includes methacrylate) all of which are first polymerized in a volatile organic solvent therefore during a catalyzed addition polymerization first phase or step.

The use of a quantity of isobornyl acrylate (or methacrylate) has been found to have two advantageous end results. The first is the increase in solubility in aliphatic solvents of both the first formed polymer, as well as the final polymeric products. Heretofore, it has been most unusual to find automotive acrylic enamels to be soluble without cloud in aliphatic hydrocarbon solvents and very often they are objectionably cloudy and lacking in transparency.

Additionally, use of isobornyl methacrylate has also been found to contribute to the overall performance of the final polymeric product, herein sometimes called the "automotive vehicle" or binder phase of the automotive recoat enamel, the latter being a final product made by pigmenting said polymeric product.

A general method of reduction to practice of this invention is by interpolymerization in a distilling flask with an organic solvent. The solvent is brought up to heat (200°-350° F.). The monomeric acrylic components including glycidyl methacrylate, alkyl acrylate, isobornyl methacrylate, and addition polymer catalyst (many known) are blended together. We hand found t-butyl perbenzoate exemplary and useful as an addition catalyst. All the prior components are pre-mixed and transferred to a dropping funnel. The foregoing monomer mixture is slowly dropped into the hot solvent in the distilling flask over a period of several hours with good agitation.

Often a periodic addition of catalyst is beneficial near the end of and subsequent to the acrylic monomer addition period.

After the first acrylic polymerization is essentially complete, the drying oil fatty acids or substantial equivalent are incorporated in the contents of the flask and the heat may be increased at that time. The oil-modifying component is incorporated. While one may simply use a drying oil fatty acid which provides chemical modification of the first formed acrylic polymer, a preferred method of modification is to separately prepare, by direct esterification, the difatty acid ester of dimethylol propionic acid. By this procedure, one can reduce the amount of the more expensive glycidyl methacrylate essential to oil modification by as much as 50% without adversely effecting the quality of the final product.

After esterification of the acid containing moiety, the epoxide group of the glycidyl acrylate is opened to form an additional esterifiable hydroxyl group. If the original solvent used is an aromatic type, or otherwise objectionable, it is distilled off and replaced in whole or in part with an aliphatic hydrocarbon solvent of low Kauri-butanol number (of the order of 35 to 37). Objectionable volatile solvents are thereafter no longer essential.

Having completed the first polymer formation as above described, a second polymer is formed within the first in a sequential step.

To the first formed polymer held at or within the 200° to 350° F. temperature range, the solvent-polymer solution at substantial reflux, a slow addition of styrene, from in excess of 25% to as much as 100% styrene monomer or more based on the solids of the first formed polymer, along with the free radical addition catalysts (including as illustrative t-butyl perbenzoate, t-butyl peroctoate, dibenzoyl peroxide, azobisisobutyronitrile, etc.) are incorporated in the initial polymeric acrylate mass and the temperature held for complete conversion of the latter monomer to polymer, as determined by gravimetric non-volatile tests. Small amounts of other polymerizable monomers including isobornyl methacrylate, acrylonitrile, alkyl acrylate esters, etc. may be coblended with the styrene without departing from the invention. The acid value of the final resin solids are less than 10, preferably about 5 or less.

In a series of experimental runs, it was determined that taping time, the time before masking tape can be safely applied over a fresh film of enamel made from pre and post added styrene without film deterioration, could be significantly reduced by post-addition of the styrene monomer as described above. Three mil pigmented polymer films were found to "tape" in about 2 hours whereas greater than 6 hours was commonly required where styrene was attempted to be incorporated in and during the first acrylic interpolymerization step.

It is suggested that the polymer formed from the "two step post addition" process one produces a highly branched polymer comprising microdisperse polystyrene phase in a continuous oil-modified polyacrylic phase.

The process of first forming the oil modified acrylate (methacrylate) polymer and sequentially polymerizing the styrene, post, gives rise to higher and broader glass transition temperatures, to display products having a two-step transition (evidence of the suggested (supra) microdisperse phase separation), yet the polymeric vehicle product vehicles are generally clear (prepigmentation) and without appreciable cloud. In any event, the two step process provides marked improvement in the time (reduction) of ultimate enamel films made therefrom to dry before being taped (masking tape).

The following examples are not intended to be exhaustive, but illustrate the best mode of practice of this invention known at the time of disclosure.

EXAMPLE 1

A glass lined reaction vessel equipped with agitator, condenser and a controllable rate gravity feed auxiliary supply tank and controllable heating unit was given an initial charge of 203.4 lbs. of a low aromatic content mineral spirits, 43 lbs. N-butyl acetate and 86 lbs. of toluene. An auxiliary supply tank was loaded with a mixture comprising 28 lbs. glycidyl methacrylate, 42 lbs. isobornyl methacrylate, 10 lbs. isobutyl methacrylate, 73.5 lbs. methyl methacrylate and 3.70 lbs. of azo bis isobutyronitrile addition catalyst.

In a secondary reactor, a quantity of ester was prepared from a fusion reaction at about 450° F. of 149 lbs. dimethylol propionic acid with 621 lbs. of a drying oil fatty acid (tall oil fatty acids) in stoichiometric ratio of about one mol of the dihydroxy acid with two mols of fatty acid. 102.5 lbs. of this ester having an acid value of 85.90 was weighed out in advance.

The solvent containing reaction vessel was heated to about 180° F., with reflux condenser cooling. The mixed monomer content of the supply tank was slowly admitted into the reaction vessel with all condensate being returned over a two hour period. At that time, the cooling was adjusted to allow an exotherm to 240° F. over the next hour. The temperature was held at 240° F. for an additional 2 hours at which time the 102.5 lbs. of the above dimethyl propionic acid ester was incorporated in the reaction mass and the temperature brought to 250° F. The reaction mass held at that temperature for a clear pill (about three hours). Acid value about 30.

The remainder of the reaction is carried out at 250° F., and upon obtaining the above clear pill, a further blend of monomers first pre-metered into the supply tank consisting essentially of 33 lbs. isobornyl methacrylate, 135 lbs. styrene, 10 lbs. of isobutyl methacrylate and 3.14 lbs. of t-butyl perbenzoate are fed at an even rate into the agitated reaction mass over a two hour period. 0.38 lbs. of triethylamine is then incorporated in the reaction mass. After an additional hour, a first of four periodic additions of 0.55 lbs. of t-butyl perbenzoate are added and stirred in. The second and remaining two t-butyl perbenzoate additions are made two hours apart holding the reaction temperature at 250° F. Polymerization is completed after a total of about 20 hours from the start. The acid value is about 4 and the non-volatile solids content is reduced to about 50% with aliphatic solvent (mineral spirits).

The resulting acrylic-styrene polymer was soluble in aliphatic solvents and set to a hard, clear, gasoline resistant film.

Example 7 of British Pat. No. 1,399,159 was produced according to the specification with the substitution of linseed fatty acids for the (conjugated) dehydrated castor oil fatty acid (not available). The prior art product in an equal pigmented enamel was compared with the product of Example 1 above. Results are tabulated below:

|  | Example 1 | Patentee |
|---|---|---|
| Set to Touch Time | 3 min. | 27 min. |
| Tack Free Time (Zapon) | 10 min. | Tacky 72 hrs. |
| Tape Time | 2½ hrs. | 72 hrs. |
| Pencil Hardness |  |  |
| 24 hrs. | B | Softer than 5B |
| 72 hrs. | HB | Softer than 5B |
| Gloss | Excellent | Excellent |
| Gasoline Resistance |  |  |
| 24 hrs. | 100 + Double rubs | Fail 1 rub |
| 72 hrs. | 100 + Double rubs | Fail 1 rub |

Insofar as Applicants are aware, no acrylic interpolymer of the prior art is reducible with low K-B hydrocarbon solvents to an infinite extent as is Example 1 product.

Variations can be made in the composition of Example 1 which produce a substantially equivalent quality product but at increase in cost. For example, soya bean oil fatty acids can replace in whole or in part the fatty acid ester of dimethylol propionic acid, but an increased quantity of glycidyl methacrylate is also required to make this substitution operable.

EXAMPLE 2

This example further demonstrates the two step post-addition process used to prepare the novel resins disclosed herein. To a glass, three-necked electrically heated distilling flask fixed with agitator, thermometer-controller, inert blanket and addition funnel are added 90 parts of a VM&P naphtha and 10 parts of butyl acetate. A mixture of 6.73 parts glycidyl methacrylate, 10 parts isobornyl methacrylate, 17.46 parts methyl methacrylate and 0.76 parts t-butyl perbenzoate are added dropwise over a period of two hours while the contents of the reactor is maintained at 270° F. When all of the catalyzed monomer mixture is added 24.34 parts of an ester formed from the reaction of two moles of soya fatty acid and one mole of dimethylol propionic acid (RL 2198) is added and after about 15 minutes dropwise addition of a second monomer mix comprised of 7.85 parts of isobornyl methacrylate, 32.0 parts of styrene and 0.55 parts of t-butyl perbenzoate are added over a period of about 1½ hours the reaction being maintained at 270° F. throughout this procedure. 0.9 parts of triethyl amine and 0.2 parts additions of t-butyl perbenzoate are added every two hours until theoretical conversion is obtained and the acid value is below 5. This yielded a clear resin solution having a non-volatile content of 50%, a viscosity of about 90 poise, an acid value of 2.3.

EXAMPLE 3

A resin was made using the procedure outlined in Example 2 wherein the initial solvent added was 70 parts VM&P; 20 parts toluene and 10 parts butyl acetate. The first monomer mixture consisted of 6.4 parts glycidyl methacrylate, 9.5 parts isobornyl methacrylate, 16.7 parts methyl methacrylate, 2.2 parts isobutyl methacrylate and 0.24 parts azobisisobutyonitrile and the temperature of the reaction was maintained at 180°–200° F. throughout the course of the addition. Two additional charges of 0.25 and 0.15 parts azobisisobutyronitrile spaced one hour apart were made before adding 24.2 parts of dimethylol propane disoyate increasing temperature to 245° F. and beginning the second monomer addition which consisted of 7.5 parts isobornyl methacrylate, 2.2 parts isobutyl methacrylate, 30.5 parts styrene and 0.7 parts t-butyl perbenzoate. Upon completion of this addition, 0.9 parts of triethylamine and additions of 0.12 parts of t-butyl perbenzoate spaced two hours are made until gravimetric non-volatile test indicates near theoretical conversion and acid value is below 5. The resulting resin was clear, had a viscosity of about 60 poise at 52% non-volatile content and had an acid value of 3.2.

EXAMPLES 4-13

These examples were prepared utilizing the procedure outlined in Example 2. It is to be noted that the total monomer ratio of all these resins is identical and the compositions differ only in whether specific monomer was added during the first stage of the reaction or the "post-addition" stage. The data for taping time, taping time normalized to 3 mil film thickness and 20° gloss for silver metallics formulated from the various is given. It is to be noted that Examples 6 though 9, those examples where in a significant amount of methyl methacrylate were added during the post-addition stage, gave extremely high viscosities and separated from solution requiring extensive dilution in strong oxygenated solvent to obtain an enamel which could be cast into a film. This data shows that only compositions in which the basic acrylic is free of styrene and the post addition is essentially styrene give coatings with appropriate taping times (less than 4 hours), acceptable gloss and acceptable viscosity and solubility in essentially aliphatic solvent coats.

| Examples | 4 | 5 | 6 | 7 | 8 | 9 | 10 | 11 | 12 | 13 |
|---|---|---|---|---|---|---|---|---|---|---|
| First Addition |  |  |  |  |  |  |  |  |  |  |
| GMA | 6.75 | 6.75 | 6.75 | 6.75 | 3.3 | 6.75 | 6.75 | 6.75 | 6.75 | 6.00 |
| IBOMA | 10.03 | 10.03 | 10.03 | 10.03 | 9.5 | 10.03 | 17.9 | 10.03 | 10.03 | 17.9 |
| Styrene | — | 16.0 | 16.0 | 16.0 | 16.0 | 32.0 | — | 24.0 | 8.0 | 32.0 |
| MMA | 17.5 | 17.5 | 9.5 | — | 9.5 | — | 17.5 | 17.5 | 17.5 | 17.5 |
| tbpb | 0.6 | 0.6 | 0.6 | 0.6 | 0.6 | 0.9 | 0.6 | 0.8 | 0.6 | 1.2 |
| RL 2198* | 24.4 | 24.4 | 24.4 | 24.4 | 12.2 | 24.4 | 24.4 | 24.4 | 24.4 | 24.4 |
| TEA | — | — | — | — | 0.04 | — | — | — | — | — |
| Second Addition |  |  |  |  |  |  |  |  |  |  |
| GMA | — | — | — | — | 3.45 | — | — | — | — | 0.75 |
| IBOMA | 7.87 | 7.87 | 7.87 | 7.87 | 8.0 | 7.87 | — | 7.87 | 7.87 | — |
| Styrene | 32.0 | 16.0 | 16.0 | 16.0 | 16.0 | — | 32.0 | 8.0 | 24.0 | — |

-continued

| Examples | 4 | 5 | 6 | 7 | 8 | 9 | 10 | 11 | 12 | 13 |
|---|---|---|---|---|---|---|---|---|---|---|
| First Addition | | | | | | | | | | |
| MMA | — | — | 8.0 | 17.5 | 8.0 | 17.5 | — | — | — | — |
| tbpb | 0.6 | 0.6 | 0.6 | 0.6 | 0.6 | 0.3 | 0.6 | 0.4 | 0.6 | — |
| RL 2198* | — | — | — | — | 12.2 | — | — | — | — | — |
| TEA | 0.1 | 0.1 | 0.1 | 0.1 | 0.05 | 0.1 | 0.1 | 0.1 | 0.1 | 0.1 |
| Properties | | | | | | | | | | |
| NVM | 46.1 | 47.8 | 48.1 | — | — | 49.9 | 47.6 | — | 48.6 | — |
| Viscosity | 63 | 40 | — | — | — | — | 63 | — | 13 | — |
| Acid Value | 3.1 | 3.1 | 4.3 | — | — | — | — | — | 2.5 | — |
| SPG | 0.912 | 0.903 | — | — | — | — | 0.900 | — | 0.895 | — |
| Clarity | Clear | Clear | Cloudy Separation | Very Cloudy Separation | Very Cloudy Separation | Cloudy Separation | Sl. Haze | Very Cloudy | Sl. Haze | Very cloudy |
| Thickness (mils) | 3.0 | 2.6 | 3.6 | 3.5 | 3.2 | 4.1 | 4.5 | 2.7 | 4.5 | 4.0 |
| Tape (hrs.) | 3–4 | 5–6 | 5–6 | 4 | 6+ | 6+ | 5–6 | 6+ | 6+ | 5–6 |
| Thickness | 3–4 | 6–7 | 4–5 | 3–4 | 6+ | 6+ | 3–4 | 6+ | 6+ | 4–5 |
| (Film 3–4 Thickness normalized to 3 mil) | | | | | | | | | | |
| 20° Gloss | 51 | 60 | 59 | 47 | 62 | 58 | 58 | 61 | 61 | 62 |

*Note:
RL 2198 is dimethylolpropionic acid idisoyate, A.V. 84–92.

The coatings prepared for this study were metallics prepared as follows:

| Ingredient | Parts by Weight |
|---|---|
| 50% Resin Solution | 544 |
| 66% Aluminum Paste | 14.8 |
| Butyl Acetate | 40 |
| VM&P Naphtha | 156.8 |
| Acetone | 43 |
| 18% Orthocresol Solution | 1.2 |

The above ingredients are shaken on a shaker mill for thirty minutes. The enamel was reduced further with 75 parts per 100 parts by volume with a commercial synthetic enamel reducer.

EXAMPLES 14–17

The following examples prepared utilizing the procedure outlined in Example 3 further demonstrate the compositions of the instant invention.

| Examples | 14 | 15 | 16 | 17 |
|---|---|---|---|---|
| First Addition | | | | |
| GMA | 6.74 | 6.74 | 6.74 | 6.74 |
| IBOMA | 9.2 | 8.7 | 7.8 | 6.3 |
| MMA | 16.07 | 15.2 | 13.59 | 11.0 |
| tbpb | 0.75 | 0.75 | 0.75 | 0.75 |
| RL 2198* | 24.35 | 24.35 | 24.35 | 24.35 |
| Second Addition | | | | |
| IBOMA | 7.3 | 6.8 | 6.09 | 4.94 |
| Styrene | 34.8 | 36.6 | 39.9 | 45.09 |
| tbpb | 0.75 | 0.75 | 0.75 | 0.75 |
| TEA | 0.09 | 0.09 | 0.09 | 0.09 |
| Non-Volatile Content | 54.2 | 52.5 | 52.3 | 50.3 |
| Viscosity (Poise) | 65 | 65 | 56 | 45 |
| Hr. Tape Time (3mil) | 2 | 2– | 2 | 2 |
| 20° Gloss White | 78 | 76 | 30 | 78 |
| (% Reflectance) Silver | 57 | 60 | 55 | 41 |

| Examples | 18 | 19 | 20 | 21 | 22 |
|---|---|---|---|---|---|
| First Addition | | | | | |
| GMA | — | 15.0 | 6.75 | 6.75 | 6.75 |
| IBOMA | 10.03 | 10.03 | 15.0 | — | 15 |
| MMA | 17.5 | 9.25 | — | 12.5 | 7.5 |
| IBMA | — | — | 12.5 | — | — |
| GA | 6.75 | — | — | — | — |
| IBOA | — | — | — | 15 | — |
| BMA | — | — | — | — | 5 |
| tbpb | 0.6 | 0.6 | 0.6 | 0.6 | 0.6 |
| Soya Fatty Acid | — | 24.35 | — | — | — |
| RL 2198 | 24.35 | — | 24.35 | 24.35 | 24.35 |
| Second Addition | | | | | |
| IBOMA | 7.87 | — | — | — | 3.87 |
| AMS | — | — | — | — | 10 |
| Styrene | 32 | 22 | 19.87 | 22 | 26 |
| TBS | — | 10 | 20 | — | — |
| IBOA | — | 7.87 | — | 12.87 | — |
| VT | — | — | — | 5 | — |
| tbpb | 0.6 | 0.6 | 0.6 | 0.6 | 0.6 |
| TEA | 0.1 | 0.1 | 0.1 | 0.1 | 0.1 |

The abbreviation used in the foregoing tables are:
GMA glycidyl methacrylate
  isobornyl methacrylate IBOMA
MMA methyl methacrylate
IBMA isobutyl methacrylate
GA glycidyl acrylate
IBOA isobornyl acrylate
BMA n-butyl methacrylate
tbpb tert-butyl perbenzoate
RL 2198* dimethylol propionic acid disoyate ester
AMS alpha methyl styrene
St styrene
TBS tert-butyl styrene
VT vinyl toluene
TEA triethyl amine The abbreviations used in the foregoing tables are:
GMA — glycidyl methacrylate
IBOMA — isobornyl methacrylate
MMA — methyl methacrylate
IBMA — isobutyl methacrylate
GA — glycidyl acrylate
IBOA — isobornyl acrylate
BMA — n-butyl methacrylate
tbpb — tert-butyl perbenzoate
RL 2198* — dimethylol propionic acid disoyate ester
AMS — alpha methyl styrene
St — styrene
TBS — tert-butyl styrene
VT — vinyl toluene
TEA — triethyl amine The following are typical enamel formulations utilizing the resins of this disclosure to formulate automotive top coat enamels. The enamel examples would normally be applied reduced with 50 parts per hundred by volume of a proprietary drierreducer for spray application.

| I. Blue Metallic Enamel | Wt. (gms) | Percent |
|---|---|---|
| Pigment 2.5% | | |
| Channel Black | 3 | .05 |
| Cyan Blue | 60 | 1.00 |
| Metallic Pigment | 90 | 1.50 |
| Total Pigment | 153 | |
| Vehicle 97.5 | | |
| Modified Acrylic of Example | | |
| (Introduced at 50% Solids | | |
| in VM&P Naphtha) | 5088 | 84.8 |
| VM&P Naphtha | 759 | 12.7 |
| Total Vehicle | 5847 | |
| Total Weight | 6000 | |
| II. White Enamel | | |
| Pigment 14.3% | 798 | 14.00 |
| Rutile Titanium Dioxide | 798 | 14.00 |

-continued

| | | |
|---|---|---|
| Irgazin Yellow | 17 | .30 |
| Total Pigment | 615 | |
| Vehicle 85.7% | | |
| Modified Acrylic of Example | | |
| (Introduced at 50% Solids | | |
| in VM&P Naphtha) | 4387 | 77.00 |
| VM&P Naptha | 498 | 8.74 |
| Total Vehicle | 4885 | |
| Total Weight | 5700 | |
| Resin Solids | 38.5% | |
| Total Solids | 52.8% | |

A series of runs were also made varying the quantity of isobornyl methacrylate in a range of from 25% to 54% by weight of the non-volatile solids content of the polymer. Increase of this monomer gave clear polymers of decreasing viscosity. Above 10% one can obtain a vehicle product completely solubility in straight (100%) aliphatic solvents.

While the illustrative examples above disclose the best mode known to practice the invention, other modifications are possible without departing from the spirit of the invention. One need not use other acrylic monomers in the second phase polymerization with the styrene, although some advantage has been noted through such modification. In principal, a first acrylic polymer suitable for coatings is formed, and in the post polymerization of the styrene therein a heterogenous, microdisperse phase is formed, which, through optically clear both in solution in aliphatic solvents and in a solids cast film, separate phases can be detected by differential thermal analysis.

Post addition of the styrene is very important to the tape times. While very small amounts of styrene monomer can be tolerated in the first polymerization step, there is often some cloudiness develop and taping times are not at an optimum and are increased objectionably and generally. In other words, such practice is not found advantageous, hence not preferred thought permissible.

Having illustrated the best mode known to practice our invention, we claim:

1. Fast-drying, aliphatic hydrocarbon solvent soluble polyacrylic enamel vehicle binders prepared by initially polymerizing from about 5% to less than 30% by weight of glycidyl methacrylate, from about 15% to about 75% by weight of a drying oil fatty acid containing moiety, from about 35% to 75% by weight of one or more alkyl acrylates and/or hydroxy alkyl acrylates and from 5% to 50% by weight of an isobornyl acrylate or isobornyl methacrylate to from an initial polymer and thereafter interpolymerizing therein from about 1% to 100% by weight thereof of a polymerizable monomer consisting essentially of styrene.

2. The product of claim 1 wherein from 5% to 45% by weight of the polymeric solids thereof of an unsaturated polymerizable monomer comprising styrene is post polymerized into the initial reaction mass.

3. The product of claim 1 where the drying oil fatty acid ester moiety is the di fatty acid ester of dimethylol propionic acid.

4. The product of claim 3 wherein the glycidyl methacrylate component is from 3% to 20% of the initial polymer.

5. A method for production of a polyacrylic enamel vehicle binder which comprises initially polymerizing from about 5% to less than 30% by weight of glycidyl methacrylate and from about 35% to 75% of one or more alkyl acrylate and/or hydroxy alkyl acrylate and from 5% to 50% of an isobornyl acrylate or isobornyl methacrylate by heating the said monomers together in a volatile organic solvent; after a first exotherm has been noted, adding a quantity of from 10% to about 45% by weight of a substantially non-conjugated unsaturated drying oil acid ester and containing the reaction for a time and temperature sufficient to reduce the acid value of the reaction mass to less than 50 and thereafter post-polymerizing a monomer in said reaction mass consisting essentially of styrene in the presence of addition catalysts until substantially all the said monomeric styrene no longer refluxes from the first-formed acrylic interpolymer above and the acid value has been reduced to less than about 5.

* * * * *